(12) United States Patent
Williams et al.

(10) Patent No.: US 6,259,982 B1
(45) Date of Patent: Jul. 10, 2001

(54) METHOD AND APPARATUS FOR CONTROLLING AN ACTIVE SUSPENSION SYSTEM

(75) Inventors: Daniel E. Williams; Abraham H. Ghaphery, both of Stuart, FL (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 08/013,813

(22) Filed: Feb. 2, 1993

(51) Int. Cl.⁷ .................................................. B06G 17/015
(52) U.S. Cl. .................... 701/38; 701/48; 701/82; 703/8; 280/707
(58) Field of Search .................. 364/424.05, 508, 364/424.01, 426.02; 280/707, 714, 708, 711; 188/282; 701/37, 38, 82, 48, 90, 69; 703/8

(56) References Cited

U.S. PATENT DOCUMENTS

| | | | |
|---|---|---|---|
| 4,215,403 | * | 7/1980 | Pollard et al. . |
| 4,368,900 | | 1/1983 | Beusse .................................. 280/707 |
| 4,625,993 | * | 12/1986 | Williams et al. ............... 364/424.05 |
| 4,729,580 | * | 3/1988 | Buma et al. ..................... 364/424.05 |
| 4,761,022 | | 8/1988 | Ohashi et al. ........................ 280/772 |
| 4,787,650 | * | 11/1988 | Doi et al. ......................... 364/424.05 |
| 4,809,179 | * | 2/1989 | Klinger et al. ................... 364/424.05 |
| 4,838,574 | | 6/1989 | Baraszu ............................ 364/424.01 |
| 4,848,791 | | 7/1989 | Bridges ................................ 280/707 |
| 4,881,172 | | 11/1989 | Miller .............................. 364/424.05 |
| 4,903,209 | * | 2/1990 | Kaneko ............................ 364/424.05 |
| 4,905,152 | * | 2/1990 | Kawabata ........................ 364/424.05 |
| 4,907,154 | | 3/1990 | Yasuda et al. ........................ 280/707 |
| 4,916,632 | * | 4/1990 | Doi et al. ......................... 364/424.05 |
| 4,924,393 | * | 5/1990 | Kurosawa ........................ 364/424.05 |
| 4,934,731 | | 6/1990 | Hiwatashi et al. .................... 280/698 |
| 4,953,089 | | 8/1990 | Wolfe .............................. 364/424.05 |
| 4,967,361 | | 10/1990 | Kamimura et al. ............. 364/424.05 |
| 5,033,770 | | 7/1991 | Kamimura et al. ............. 364/424.05 |
| 5,097,419 | * | 3/1992 | Lizell .............................. 364/424.05 |
| 5,126,942 | * | 6/1992 | Matsuda ......................... 364/426.02 |
| 5,160,161 | * | 11/1992 | Tsukamoto ...................... 364/424.05 |
| 5,162,995 | * | 11/1992 | Ikemoto et al. ................. 364/424.05 |
| 5,174,598 | * | 12/1992 | Sato et al. ....................... 364/424.05 |
| 5,217,246 | * | 6/1993 | Williams et al. .................... 280/707 |
| 5,218,546 | * | 6/1993 | Bradshaw et al. .............. 364/424.05 |
| 5,231,583 | * | 7/1993 | Lizell .............................. 364/424.05 |
| 5,402,341 | * | 3/1995 | Liubakka et al. ............... 364/424.05 |

* cited by examiner

Primary Examiner—Kevin J. Teska
Assistant Examiner—Phai Phan
(74) Attorney, Agent, or Firm—Tarolli, Sundheim, Covell, Tummino & Szabo L.L.P.

(57) ABSTRACT

An apparatus for controlling a vehicle active suspension system having a plurality of actuatable hydraulic motors, each corner having a motor connecting the sprung mass with its associated unsprung mass. Each motor has an associated spool valve for connecting either of two expandable fluid chambers of said motor to a pump or reservoir. Each corner has an associated force sensor for sensing the force value between its associated unsprung mass and the sprung mass. An analog, closed force loop control circuit provides a valve control signal having a value functionally related to the difference between a sensed force value and a desired force value for a selected corner. The closed loop control circuit includes a variable gain amplifier for controlling the value of the valve control signal as a function of the frequency of variations in the difference between the sensed force value and the desired force value on the selected corner. The amplifier gain is controlled as a function of hub velocity so as to undamp a selected corner and as a function of chassis velocity so as to damp the chassis. A digital processing circuit determines a displacement error value for selected corner. The displacement error value is summed with the valve drive signal. An actuator bump stop arrangement is also provided.

26 Claims, 2 Drawing Sheets

METHOD AND APPARATUS FOR CONTROLLING AN ACTIVE SUSPENSION SYSTEM

TECHNICAL FIELD

The present invention is directed to a vehicle active suspension system and is particularly directed to a method and apparatus for controlling the active suspension system.

BACKGROUND ART

Vehicle suspension systems are well known in the art. Such suspension systems have as their goal the control of the relative motion between the sprung mass (the vehicle chassis) and the unsprung mass (the suspension arms, wheels, tires, etc.) of the vehicle. Passive suspension systems, such as shock absorbers, absorb and dissipate some of the energy and motion produced in an automotive vehicle by road surface irregularities when a vehicle is driven over such irregular road surface.

Passive suspension systems provide good vibration isolation at a relatively narrow range of vibration frequencies. A linear response of a passive suspension system can be altered by (i) adding an advantageous nonlinear attribute, such as direction dependant damping, and (ii) minimizing an objectionable effect, such as stiction, i.e., stick slip friction characteristics of the suspension system including the shock absorber. Passive systems, however, react only to applied forces from below the unsprung mass, i.e., from the road surface, and from above the unsprung mass, i.e., from inertia of the sprung mass or vehicle body. Ideally, the suspension system should appear "soft" in reacting to road surface induced inputs, ("road noise") and stiff when reacting to vehicle body accelerations and motions, ("inertia inputs"). Since a passive system cannot distinguish between the origin of the two types of vibration, an engineering compromise is made.

An active suspension system uses power from the vehicle engine to actively move the vehicle wheels over an irregular road surface usually with the objective of maintaining a constant force between the vehicle wheel and the road surface. Rather than a shock absorber, as is found in passive suspension system, an active suspension system uses a hydraulic servo-actuator, i.e., a hydraulic motor, to move, or control the forces in, the vehicle wheel. A plurality of sensors, for detecting impact, force, acceleration, velocity and displacement, are located at various vehicle locations. A controller, e.g., a microcomputer, monitors the sensor outputs and controls operation of the hydraulic actuator for the vehicle wheels and suspension located at each vehicle corner through an associated electrically controlled hydraulic servo valve. Through a control algorithm, the controller controls reaction to road noise and inertia inputs and controls relative motion of the sprung and unsprung masses.

In an active suspension system, the servo valve, actuator, and controller function as an energy control device. The servo valve connects the energy source, i.e., a pump, to the energy consumer, i.e., an actuator. The difference between power in and power out is converted to heat energy by the servo valve.

In a fully active suspension system, the actuator is operated so as to move the wheel up and down relative to the vehicle body as necessary to provide a desired "ride feel" and "handling characteristic" of the vehicle. The hydraulic pump provides energy in terms of fluid flow at system pressure. The servo valves remove energy at a rate to provide fluid flow and pressure so as to move an associated wheel at a velocity needed to achieve a desired ride feel and handling characteristics. Control of fluid flow with the servo valve controls actuator direction of movement and velocity. Control of fluid pressure, in turn, controls actuator force. The control signal output to the servo valve is referred to as a valve drive signal.

SUMMARY OF THE INVENTION

The present invention provides a hybrid control arrangement for an active suspension system. An analog force closed loop control arrangement controls an actuator as a function of a difference between a measured force value and a desired force value for a selected vehicle corner. The closed loop arrangement includes a variable gain feature wherein gain is controlled as a function of the frequency of changes in the force difference between measured and desired values. A digital network measures actuator displacement and calculates actuator displacement in response to the force difference value. The digital network adds the difference between actual and calculated displacement to the control signal used to control the actuator.

In accordance with the present invention, an apparatus is provided for controlling a vehicle suspension having a sprung mass and an unsprung mass. The apparatus comprises a plurality of actuators, each corner of the vehicle having an associated actuator operatively connecting the sprung mass with its associated unsprung mass. Means are provided for sensing at least one operating characteristic of a selected corner. Means provides a desired actuator drive signal in response to the at least one sensed operating characteristic for achieving a desired operating characteristic. The apparatus further includes means for determining the difference between the at least one sensed operating characteristic and the desired operating characteristic for a selected corner. Control means responsive to the determined difference provides an actuator control signal having a value which is functionally related to the determined difference. The control means has a variable gain amplifier means for outputting the actuator control signal, wherein the gain of said amplifier means is controlled in response to the frequency of variations of the determined difference. The Apparatus further includes actuator control means for driving the actuator in response to the actuator control signal.

In accordance with a preferred embodiment, the control means for sensing at least one operating parameter includes a plurality of load sensors, each corner having an associated load sensor operatively connected between the sprung mass and its associated unsprung mass. The load sensor provides a signal having a value indicative of the force on the actuator at that corner. The desired operating characteristic is force. The determining means determines the difference between the desired force in the actuator with the sensed force therein, the difference providing an error signal. The variable gain amplifier amplifies the error signal. The apparatus further includes a hub accelerometer, means for determining hub velocity from the hub accelerometer, a chassis accelerometer, means for determining chassis velocity from the chassis accelerometer, and means for summing the determined hub velocity and chassis velocity with the amplified error signal. The summation of the determined hub velocity with the amplified error signal serves to undamp the unsprung mass of the selected corner from the sprung mass. The summation of the determined chassis velocity with the amplified error signal serves to damp the sprung mass of the selected corner. The apparatus further includes a plurality of displacement sensors, each actuator having an associated displacement sensor for sensing the actuator displacement which is functionally related to the distance between the sprung mass and its associated unsprung mass for the selected corner. Means are provided for calculating the displacement of the actuator based upon the force error signal and providing a displacement error signal having a value equal to the difference between the calculated displacement and the measured displacement. The apparatus further includes means for summing the displacement error signal with the control signal. Each of the actuators is preferably a hydraulic motor and the actuator control means includes an electric servo valve, each actuator having an associated servo valve. Each electric servo valve is operatively connected between a pump and reservoir and its associated actuator. Means are provided for sensing the end of stroke of the actuator and reducing the variable gain when the actuator nears its end of stroke.

In accordance with another aspect of the present invention, a method for controlling a vehicle suspension having a sprung mass and an unsprung mass is provided. The method comprises the steps of providing a plurality of actuators, each corner of the vehicle having an associated actuator operatively connecting the sprung mass with its associated unsprung mass, sensing at least one operating characteristic of a selected corner, and providing a desired actuator drive signal in response to the at least one sensed operating characteristic for achieving a desired operating characteristic for the selected corner. The method further includes determining the difference between the at least one sensed operating characteristic and the desired operating characteristic for the selected corner and providing an actuator control signal having a value functionally related to the difference between the sensed operating characteristic and the desired operating characteristic multiplied times a variable gain factor. The gain factor is selected in response to the frequency of variations of the determined difference. The actuator is driven in response to the actuator control signal.

In accordance with a preferred embodiment of the method in accordance with the present invention, a plurality of load sensors are provided, each corner having an associated load sensor operatively connected between said sprung mass and its associated unsprung mass for providing a signal having a value indicative of the force in the actuator on that corner and wherein the desired operating characteristic is force. The difference between the desired load and the sensed force is determined, the difference providing a force error signal. The step of multiplying includes multiplying the force error signal times the gain factor. A hub accelerometer is provided. The hub velocity is determined from the hub accelerometer. The determined hub velocity is summed with the amplified force error signal. A chassis accelerometer is provided. The chassis velocity is determined from the chassis accelerometer. The determined chassis velocity is summed with the amplified force error signal. The summation of the determined hub velocity with the amplified force error signal undamps the unsprung mass of the selected corner from the sprung mass. The summation of the determined chassis velocity with the amplified force error signal damps the sprung mass. A displacement sensor is provided for sensing the actuator displacement which is functionally related to the distance between the sprung and the unsprung mass for the selected corner. If the actuator displacement nears its maximum stroke, the variable gain factor is reduced. Displacement of the actuator is calculated and a displacement error signal is provided having a value equal to the difference between the calculated displacement and the measured displacement. The displacement error signal is summed with the actuator control signal.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
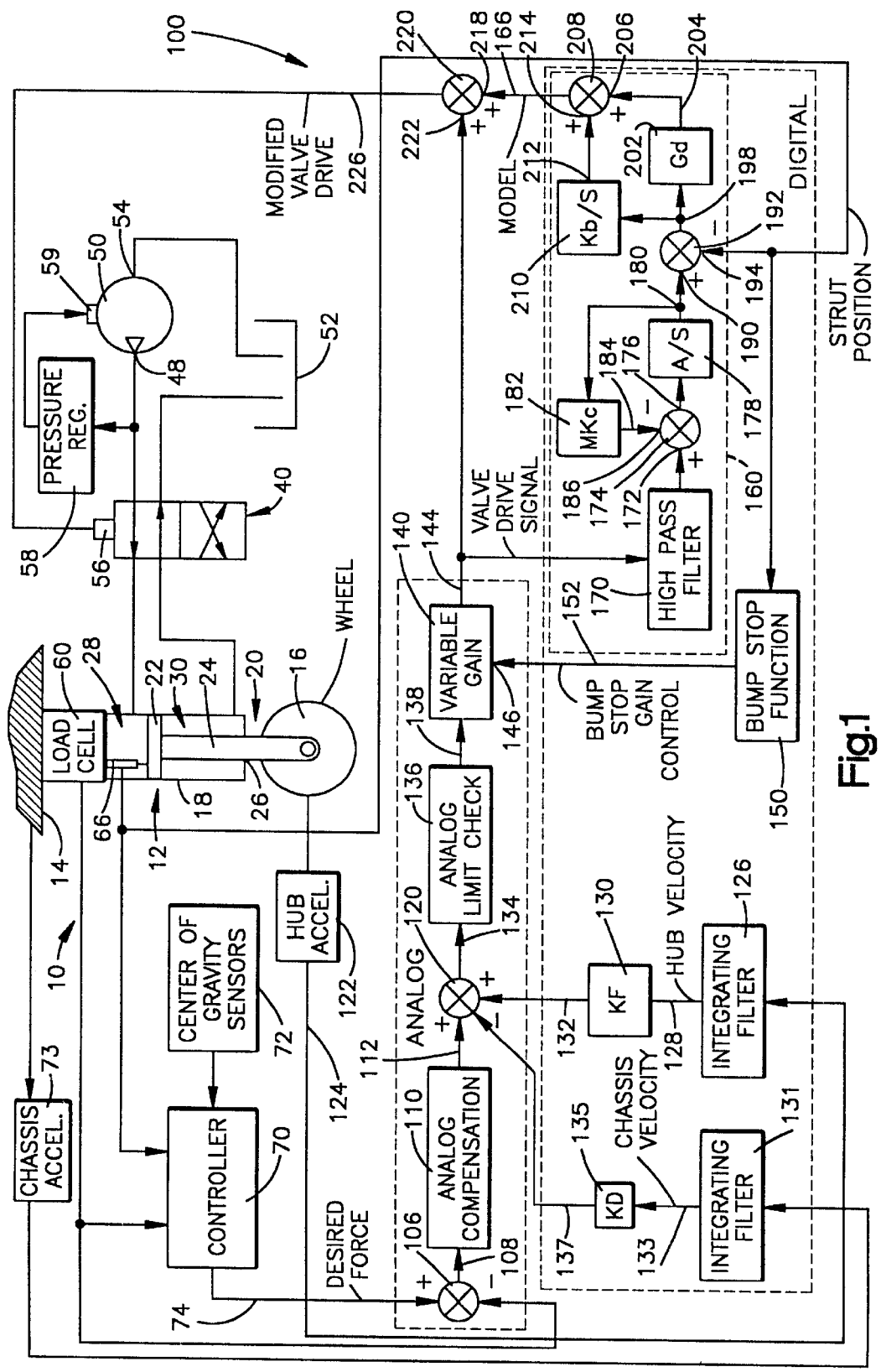
FIG. 1 is a block diagram showing a vehicle active suspension system made in accordance with the present invention.

Referring to FIG. 1, a suspension system 10 for a vehicle includes four corners corresponding to the four wheel corners of the vehicle. Through out this disclosure, the structure and operation of only one corner is described, it being understood that the structure and operation of the other three corners is similar. In the corner shown, an actuator 12 operative connects the sprung mass 14, i.e, the chassis, to its associated unsprung mass 16, i.e., the wheel upon which that corner's tire is mounted. Although not shown, a parallel load spring is operatively connected between the chassis 14 and the wheel 16.

The actuator 12 includes a cylindrical housing 18 connected to the chassis 14. A piston 20 is telescopically received in the housing 18. The piston 20 includes a piston head 22 and a piston rod 24. The piston rod end extends through one end 26 of the cylindrical housing 18 and is connected to the wheel 16. The piston head 22 divides the cylindrical housing 18 into two variable volume fluid chambers 28, 30.

The actuator 20 may be either an equal area strut or an unequal area strut. In an equal area strut, the surface area of the side of the piston head 22 facing the chamber 28 is equal to the surface area of the side of the piston head 22 facing the chamber 30. In an unequal area strut, the surface area of the side of the piston head 22 facing the chamber 28 is not equal to the area of the surface of the piston head 22 facing the chamber 30. The structure and operation of both unequal area struts and equal area struts are well known in the art and are, therefore, not described in detail herein.

Each of the chambers 28, 30 are in fluid communication with a spool valve 40. The valve 40 is in fluid communication with an output 48 of a variable displacement swash plate pump 50 and a reservoir 52. An input 54 of the pump 50 is in fluid communication with the reservoir 52. The valve 40 includes a torque motor 56 for controlling operation of the valve 40 and, in turn, fluid communication between the pump 50 and reservoir 52 with the chamber 28 and the chamber 30. This valve arrangement permits fluid pressure from the pump 50 to communicate with the chamber 28 and fluid in chamber 30 to communicate with the reservoir 52 when it is desired to drive the wheel 16 downward relative to the chassis 14. Similarly, the valve 40 permits fluid pressure from the pump 50 to communicate with the chamber 30 and fluid from the chamber 28 to communicate with the reservoir 52 when it is desired to drive the wheel 16 upward relative to the chassis 14. When it is desired to maintain the relative position between the chassis 14 and the wheel 16 fixed, the valve 40 is positioned so as to block fluid communication of the chambers 28 and 30 from either the pump 50 or the reservoir 52. The pump pressure is controlled so as to maintain a substantially constant output pressure. To accomplish this, the pump output is connected to a pressure regulator 58. The pressure regulator is connected to the pump swash plate control 59. The pressure regulator regulates the pump's output pressure by controlling pump displacement.

A load cell 60 is operatively coupled between the actuator 12 and the chassis 14. The load cell 60 provides an electric signal having a characteristic indicative of the amount of force between the actuator 12 and the chassis 14. A displacement sensor 66 is operatively connected between the housing 18 and the piston 20 and provides an electric signal indicative of the displacement of the piston 20 relative to the housing 18. The electric signal from the displacement sensor 66 is, in turn, indicative of the position of the wheel 16 relative to the chassis 14. The displacement of the piston 20 relative to the housing 18 and the position of the wheel 16 relative to the chassis 14 are all referred to as actuator displacement. The displacement sensor 66 may take any of several known forms such as an LVDT or LVIT sensor.

The outputs from the load cell 60 and from the displacement sensor 66 are electrically connected to a controller 70 such as a microcomputer. The controller 70 is further connected to a plurality of center-of-gravity ("CG") sensors 72. These CG sensors 72 are typically located at or near the center of the vehicle and detect low frequency motions of the vehicle. Such CG sensors 72 include yaw sensors, lateral accelerometers, longitudinal accelerometers, etc. These center of gravity sensors sense vehicle yaw, pitch, roll, heave, and/or warp. A chassis accelerometer 73 is connected to the chassis 14 and outputs an electric signal indicative of the vertical acceleration of the chassis 14.

The controller 70 monitors data output from all the vehicle sensors to which it is connected and provides a desired force command signal 74. The desired force demand signal is used to control pressure in the chambers 28, 30 and, thereby, to control the displacement of the piston 20 for each of the vehicle corners. By controlling the pressure in the chambers and, in turn, displacement of the piston, the force "seen" by each corner is controlled. By controlling the corner forces, heave, pitch, roll, and warp modes of vehicle movement are controlled.

One prior art arrangement for monitoring various vehicle operational sensors and providing a displacement or force demand signal for the purpose of controlling vehicle ride in the heave, pitch, roll, and warp modes is disclosed in U.S. Pat. No. 4,625,993 to Williams et al. U.S. Pat. No. 4,625,993 is hereby fully incorporated herein by reference. To achieve vehicle stability and to reduce noise, the suspension system attempts to maintain constant load or force values at each of the four vehicle corners.

In active suspension systems, the force loop gain is used as an indication of corner performance. A high force loop gain has two effects. First, high force loop gain indirectly increases the system's closed loop bandwidth response. The upper limit on the closed loop bandwidth is the open loop phase crossover frequency. By increasing the force loop gain, the closed loop bandwidth comes close to the upper limit. An increase in the closed loop bandwidth results in a decrease in closed loop system damping. Under an extreme condition, the closed loop system may become underdamped at a relatively high frequency. If this occurs, noise is amplified to an undesirable level. Second, increasing the force loop gain decreases the steady state system error that is responsive to a ramp force command input. A hybrid, i.e., analog and digital, processing circuit 100, in accordance with the present invention, uses a digital processing arrangement to establish an actuator model for control of actuator displacement and vehicle self leveling and uses an analog signal processing arrangement to close the force loop.

The control arrangement of the present invention substantially increases the vehicle stability by having a high force loop gain when the frequency of the changes in the difference between the desired corner force and the measured corner force is less than the wheel hop frequency and lower force loop gain when the frequency of the changes in the difference between the desired corner force and the measured corner force is greater than the wheel hop frequency. Wheel hop frequency is typically 12 Hz. By having the control loop gain that is functionally related to the input frequency, maximum stability of the vehicle can be achieved.

The desired force signal 74 output from the controller 70 is connected to a positive terminal of a summing circuit 106. The output of the load cell 60 is connected to a negative input terminal of the summing circuit 106. The resultant output 108 of the summing circuit 106 is an error signal having a value equal to the difference of the desired force value at the associated corner verses the measured force value. The output 108 of the summing junction 106 continuously varies as the value of the desired force signal 74 is continuously updated and the value of the measured force continuously varies. The value of the output 108 will have a frequency value that varies as the difference value varies. The output 108 of the summing circuit 106 is connected to an analog compensation circuit 110. The force loop gain of the present system is defined as the ratio of the resultant force value measured by the load cell 60 to the force error value 108.

The analog compensation circuit 110 is a variable gain amplifier and a phase shifting circuit. The circuit 110 outputs a signal 112 having a value functionally related to the frequency of the input signal 108 and being shifted in phase an amount functionally related to the frequency value of the input signal 108. The wheel hop frequency is a determining factor for control of the gain and phase shift of the analog compensation circuit 110. Assume that the wheel hop frequency is 12 Hz. The analog compensation circuit 110 is designed so as to provide a high gain value for input frequencies less than 12 Hz. For frequencies equal to or greater than 12 Hz., the gain preferably decreases linearly until a predetermined frequency value where it thereafter remains substantially constant. The predetermined frequency at which the gain remains substantially constant is that frequency at which the system phase crossover equals 180 degrees. At the 180 degree phase crossover, the force loop gain can not be greater than one, i.e., 0 dB. In accordance with one embodiment of the present invention, the analog compensation circuit is designed so as to provide a substantially constant gain of 12.5 dB for input frequencies less than 8 Hz., a linearly decreasing gain between 8 Hz. and 40 Hz. so that at the crossover frequency, the force loop gain is −6 dB. This arrangement assures maximum force loop gain at low frequencies while insuring vehicle stability at higher frequencies.

The output 112 of the analog compensation circuit 110 is connected to a positive input terminal of a summing circuit 120. A hub accelerometer 122 is operatively connected to the vehicle wheel 16 and provides an electric signal having a value indicative of the wheel acceleration in a direction normal to the chassis 14. The output 124 of the accelerometer 122 is connected to an integrating filter circuit 126. The integrating filter circuit 126 filters and integrates the hub acceleration signal and outputs a signal 128 having a value indicative of the hub velocity. The hub velocity signal 128 is connected to a gain control circuit 130. The output 132 of the gain control circuit 130 is a gain control signal having a value functionally related to the value of the hub velocity. The output 132 of the gain control circuit 130 is connected to a positive input of the summing amplifier 120.

The output of the chassis accelerometer 73 is connected to an integrating filter circuit 131. The integrating and filter circuit 131 outputs a signal 133 having a value indicative of the chassis velocity. The chassis velocity signal 133 is connected to a gain control circuit 135. The output 137 of the gain control circuit 135 is a gain control signal having a value functionally related to the value of the chassis acceleration. The output 137 of the gain control circuit 135 is connected to a negative input of the summing amplifier 120.

The integrating filter circuit 126, gain control circuit 130, the integrating filter 131, and the gain control circuit 135 are part of the system's digital network. The hub accelerometer signal and the chassis accelerometer signal are both digitally integrated and filtered. The gain control circuit 130 digitally multiplies the integrated hub signal by a gain constant KF. The output stage of the circuit 130 uses a digital-to-analog converter to output the signal 132. The gain control circuit 135 digitally multiplies the integrated chassis signal by a gain constant KD. The output stage of the circuit 135 uses a digital-to-analog converter to output the signal 137. As those skilled in the art appreciate, analog-to-digital converters and digital-to-analog converters are used to interface the digital and analog portions of the control circuit of the present invention.

The gain control signal 132 is summed with and the gain control signal 137 is subtracted from the output 112 of the analog compensation circuit 110 for the purpose of undamping the hub and damping the chassis, respectively. A signal having a value proportional to hub velocity, i.e., signal 132, is summed with the output 112 from the analog compensation circuit so as to add a hub velocity component to the end result valve drive signal. A signal having a value proportional to the chassis velocity, i.e., signal 137, is summed with the output 112 from the analog compensation circuit so as to subtract a chassis velocity component from the end result valve drive signal.

The gain of the force error signal is inversely related to damping where damping is expressed in terms of force per velocity. By summing in the hub velocity term, the strut is moved as a result of the summation of the force signal and the detected hub velocity. If the signal 132 was not summed with signal 112 as shown, the strut 12 would not move as a result of hub velocity until a force error signal was developed in load cell 60. Such an arrangement would lead to a well damped hub and result in the road input being transmitted to the chassis. By having the hub velocity summed in the summing circuit 120, the hub is undamped thereby preventing the road input from being transmitted to the chassis. Subtracting the chassis velocity in the summing circuit 120 serves to damp the chassis thereby enhancing vehicle stability.

The output 134 of the summing circuit 120 is connected to an analog limit check circuit 136 that limits the value of the summed analog compensation signal and hub velocity signal to a predetermined limit. The output 138 of the limit circuit 136 is connected to a variable gain amplifier circuit 140. The limit circuit 136 prevents the variable gain amplifier 140 from being overdriven by limiting the value of the input signal. The output 144 of the variable gain amplifier circuit is a valve drive signal having a value indicative of a desired position of the valve 40 to provide a strut force functionally related to the desired force signal 74, the measured force, and the hub velocity signal 132.

The variable gain amplifier has a gain control input 146 that is used to control the gain of the amplifier. This gain is controlled as a function of the position of the piston 24 relative to the chassis. To accomplish this function, the displacement sensor 66 is connected to a bump stop function circuit 150 which is part of the digital control network. The bump stop function circuit 150 monitors the position of the piston 24 relative to the chassis 14 and outputs a bump stop gain control signal 152 having a value that decreases the gain of the amplifier 140 as the piston head 22 nears an end of stroke position. In accordance with a preferred embodiment of the present invention, the value of the output signal 152 is a substantially, predetermined constant value when the piston head 22 is a predetermined distance away from an end of stroke position at either end of the cylindrical housing 18. The value of the gain control signal decreases when the piston head is within the predetermined distance of a end of stroke position, the amount of decrease in gain being a function from the distance from the stop. At either one of the end of stroke positions, the value of the gain control signal is at a value that results in the amplifier 140 output a valve drive signal that positions the valve so as to block fluid communication from the pump to either chamber 28, 30.

The output 144 of the variable gain amplifier 140 is connected to a digital model circuit 160. The model circuit 160 is also connected to the output of the displacement sensor 66. The model circuit 160 outputs an analog signal 166 that is a position correction term for the purpose of correcting the valve drive signal 144. Specifically, the output 144 of the variable gain amplifier circuit 140 is connected to a high pass filter circuit 170 that removes any DC bias voltage from the valve drive signal 144. The output of the highpass filter is connected to a positive input 172 of a digital summation circuit 174. The output 176 of the summation circuit 174 is connected to a digital amplifier/integrator circuit 178 having a gain of "A" which is functionally related to the actuator area. The input signal to the circuit 178 is digitally integrated and the integrated value is digitally multiplied by the gain value "A". The output 180 of the amplifier/integrator circuit 178 is connected to a gain control feedback circuit 182. The output 184 of the gain control circuit 182 is connected to a negative input terminal 186 of the summing circuit 174.

The output 180 of the amplifier/integrator circuit 178 has a value indicative of the position of the piston 24 relative to the chassis 14 if the actuator 12 was an ideal actuator. The output 180 is connected to a positive input terminal 190 of a digital summing circuit 192. The output of the position sensor 66 is connected to a negative input terminal 194 of the summing circuit 192. The output 198 of the summing circuit 192 is an error signal having a value indicative of the difference between the modelled actuator position, i.e., signal 180, and the actual measured position of the actuator 12 as measured by the position sensor 66.

The output 198 of the summing circuit 192 is connected to a digital amplifier circuit 202 having a gain value Gd. The input signal to circuit 202 is multiplied by the gain value Gd. The output 204 of amplifier 202 is connected to a positive input 206 of a summing circuit 208. The output 198 of the summing circuit 192 is also connected to a digital amplifier/integrator circuit 210 having a gain Kb. The input signal to circuit 210 is multiplied by the gain value Kb. The output 212 of the amplifier/integrator 210 is connected to another positive input 214 of the summing circuit 208. The amplifier circuit 202 and the amplifier/integrator circuit 210 form, what is referred to in the control art, a PI controller. This arrangement forces a zero mean difference between the modelled actuator position and the actual measured actuator position.

The output 166 of the summing circuit 208 is a valve drive modification signal having a value indicative of the difference between the actual actuator position and a modelled position of the actuator 12 based upon the valve drive signal 144. The output 166 of the summing circuit 208 is connected to a positive input 218 of a summing circuit 220. The output 144 of the variable gain amplifier 140 is connected to a positive input 222 of the summing circuit 220. The output 226 of the summing circuit 220 is a modified valve drive signal. In effect, the drive signal 144 from the amplifier 140 is the model signal 166 to force the actuator 12 to perform like the model actuator. The output 226 of the summing circuit 220 is connected to the torque motor 56 of the valve 40 to control the valve and, in turn, the operation of the actuator 12.

Figure 2:
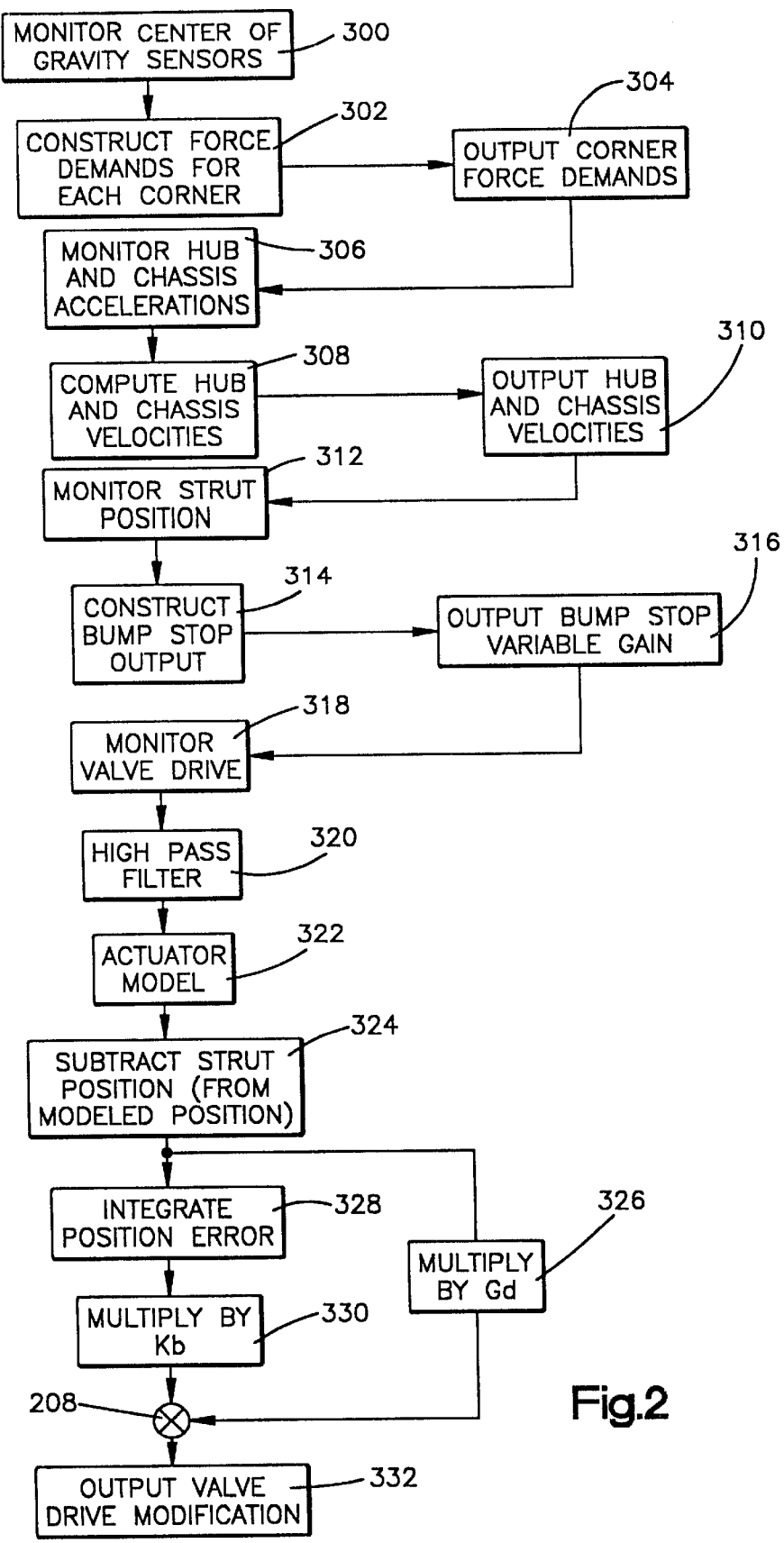
FIG. 2 is a flow diagram of a control process for the vehicle active suspension system shown in FIG. 1.

Referring to FIG. 2, the control process of the digital portion 160 of the control apparatus, in accordance with a preferred embodiment of the present invention, is depicted. In step 300, the controller 70, which is part of the digital processing circuitry, monitors the center of gravity sensors 72. In step 302, the force demands 74 for each of the corners is constructed by the controller 70. The desired force signals 74 are output to each corner in step 304. The hub accelerometers for each of the corners and the chassis accelerometer are monitored in step 306. In step 308, the hub velocities and the chassis velocity are computed by the integrating filter circuit 126 and the integrating filter circuit 131, respectively. The hub velocity signal 128 and the chassis velocity signal 133 are output in step 310. In step 312, the strut position as sensed by the sensor 66 is monitored. The bump stop output is constructed in step 314 and the variable gain signal 152 is output from the bump stop circuit 150.

In step 318, the valve drive signal 144 is monitored. The valve drive signal is high passed filtered in step 320 and the actuator model is determined in step 322. The actual strut position measured back in step 312 is subtracted from the modelled position in step 324. In step 326, the error signal 198, i.e., the difference between the actual and modelled positions, is multiplied by a value Gd. Also, the error signal 198 is integrated in step 328 and multiplied by a value Kb in step 330. The results of steps 326 and 330 are summed in 208. The process steps 326, 328, 330, and 208 form the PI control loop mentioned above. In step 332, the valve drive modification signal 166 is output in step 332.

From the above description of a preferred embodiment of the invention, those skilled in the art will perceive improvements, changes, and modifications. For example, the chassis accelerometer has been described as separate from the center of gravity sensors. It is contemplated that the chassis accelerometer may also be connected to the controller 70 and used for determination of a desired force value as well as the chassis velocity being summed in the circuit 120. Such improvements, changes, and modifications within the skill of the art are intended to be covered by the appended claims.

Having described a preferred embodiment of the invention, the following is claimed:

1. An apparatus for controlling a vehicle suspension having a sprung mass and an unsprung mass, said apparatus comprising:
   a plurality of actuators, each corner of the vehicle having an associated actuator operatively connecting the sprung mass with its associated unsprung mass;
   means for sensing at least one operating characteristic of a selected corner;
   means for providing a desired actuator drive signal in response to said at least one sensed operating characteristic for achieving a desired operating characteristic for the selected corner;
   means for determining the difference between said at least one sensed operating characteristic and the desired operating characteristic for the selected corner;
   control means responsive to said determined difference for providing an actuator control signal having a value functionally related to said difference, said control means having a variable gain amplifier means for outputting said actuator control signal, wherein the gain of said variable gain amplifier means is controlled in response to a frequency of variations of said determined difference; and
   actuator control means for driving said actuator in response to said actuator control signal.

2. The apparatus of claim 1 wherein said means for sensing the at least one operating characteristic of the selected corner includes a plurality of force sensing means, each corner having an associated force sensing means, said desired operating characteristic being desired force.

3. The apparatus of claim 2 wherein said means for sensing the at least one operating characteristic further includes at least one center of gravity sensor for sensing at least one of yaw, pitch, roll, heave, or warp of the vehicle.

4. The apparatus of claim 1 wherein said sensing means includes a plurality of load sensors, each corner having an associated load sensor operatively connected between said sprung mass and its associated unsprung mass for providing a signal having a value indicative of the force on that corner and wherein said desired operating characteristic is force, and wherein said determining means determines the difference between the desired force and the sensed force, the difference providing an error signal, said variable gain amplifier amplifying the error signal.

5. The apparatus of claim 4 further including a hub accelerometer, means for determining hub velocity from said hub accelerometer, means for summing the determined hub velocity with the amplified error signal, said summation of the determined hub velocity with the amplified error signal undamping the unsprung mass of said selected corner from the sprung mass.

6. The apparatus of claim 5 wherein said apparatus further includes a plurality of displacement sensors, each actuator having an associated displacement sensor for sensing the actuator displacement which is functionally related to the distance between the sprung mass and its associated unsprung mass for the selected corner, means for calculating the displacement of the actuator based upon said force error signal and providing a displacement error signal having a value equal to the difference between the calculated displacement and the measured displacement and wherein said apparatus further includes means for summing the displacement error signal with the actuator control signal.

7. The apparatus of claim 6 further including means for sensing when an actuator is near an end of stroke position, means for decreasing the gain of said variable gain amplifier when the actuator is sensed to be within a predetermined distance of said end of stroke position.

8. The apparatus of claim 4 further including a chassis accelerometer, means for determining chassis velocity from said chassis accelerometer, means for subtracting the determined chassis velocity with the amplified error signal, said subtraction of the determined chassis velocity with the amplified error signal damping the sprung mass.

9. The apparatus of claim 1 wherein each of said actuators is a hydraulic motor and wherein said actuator control means includes controllable spool valves, each actuator having an associated controllable spool valve, each controllable spool valve being operatively connected between a pump and reservoir and its associated actuator.

10. An apparatus for controlling a vehicle active suspension system having a plurality of actuatable hydraulic motors operatively connected to the sprung mass, one motor associated with each vehicle corner and having an associated unsprung mass, a fluid pump, and a plurality of spool valves, each motor having an associated spool valve for connecting either of two expandable fluid chambers of said motor to the pump to move its associated unsprung mass relative to the sprung mass, said apparatus comprising:

a plurality of force sensing means, each corner having an associated force sensing means for sensing the force value between its associated unsprung mass and the sprung mass;

closed loop control means for determining a desired force value for a selected corner and providing a valve control signal having a value functionally related to the difference between the sensed force value on said selected corner and the desired force value on said selected corner, said closed loop control means including a variable gain amplifier for controlling the value of said valve control signal as a function of the frequency of variations in said difference between the sensed force and the desired force value on said selected corner.

11. The apparatus of claim 10 wherein said variable gain amplifier provides has a first gain value when said difference frequency is less than a first predetermined value, said gain value of said variable gain amplifier linearly decreasing in value as said difference frequency increases from a value equal to or greater than said first predetermined value and remaining substantially constant when said difference frequency is greater than a second predetermined value.

12. The apparatus of claim 10 further including a plurality of hub accelerometers, each corner having an associated hub accelerometer for sensing the acceleration of its associated unsprung mass, means for determining the velocity of the unsprung mass for selected corner from its associated hub accelerometer, means for adding determined hub velocity to the valve control signal for said selected corner for undamping the unsprung mass of said selected corner.

13. The apparatus of claim 10 further including a chassis accelerometer for sensing the acceleration of the sprung mass, means for determining the velocity of the sprung mass from the chassis accelerometer, means for subtracting determined chassis velocity to the valve control signal for a selected corner for damping the sprung mass.

14. The apparatus of claim 10 further including a plurality of displacement sensing means for sensing displacement between the sprung mass and an unsprung mass, each corner having an associated displacement sensing means, means for determining when the hydraulic motor of said selected corner is within a predetermined distance of its end of stroke position, means for decreasing said valve control signal when said means for determining when the hydraulic motor of said selected corner is within said predetermined distance of its end of stroke position.

15. The apparatus of claim 10 further including a plurality of displacement sensing means for sensing displacement between the sprung mass and an unsprung mass, each corner having an associated displacement sensing means, means for determining the distance between the sprung mass and the unsprung mass of said selected corner in response to the value of the valve control signal, means for determining the difference between the determined distance between the sprung and unsprung mass of the selected corner and the sensed displacement between the sprung and unsprung mass of the selected corner, and means for adding the determined displacement difference between the determined distance between the sprung and unsprung mass and the sensed displacement of the selected corner to the valve control signal.

16. The apparatus of claim 15 further including means for determining when the hydraulic motor of said selected corner is within a predetermined distance of its end of stroke position, means for decreasing said valve control signal when said means for determining when the hydraulic motor of said selected corner is within said predetermined distance of its end of stroke position.

17. The apparatus of claim 15 further including a plurality of hub accelerometers, each corner having an associated hub accelerometer for sensing the acceleration of its associated unsprung mass, means for determining the velocity of the unsprung mass for selected corner from its associated hub accelerometer, means for adding determined hub velocity to the valve control signal for said selected corner for undamping the unsprung mass of said selected corner.

18. The apparatus of claim 15 further including a chassis accelerometer for sensing the acceleration of the sprung mass, means for determining the chassis velocity, means for subtracting determined chassis velocity to the valve control signal for a selected corner for damping the sprung mass.

19. A method for controlling a vehicle suspension having a sprung mass and an unsprung mass, said method comprising the steps of:

providing a plurality of actuators, each corner of the vehicle having an associated actuator operatively connecting the sprung mass with its associated unsprung mass;

sensing at least one operating characteristic of a selected corner;

providing a desired actuator drive signal in response to the at least one sensed operating characteristic for achieving a desired operating characteristic for the selected corner;

determining the difference between the at least one sensed operating characteristic and the desired operating characteristic for the selected corner;

providing an actuat or control signal having a value functionally related to said difference between the sensed operating characteristic and the desired operating characteristic multiplied times a variable gain factor, wherein the variable gain factor is selected in response to a frequency of variations of said determined difference; and driving said actuator in response to said actuator control signal.

20. The method of claim 19 wherein said step of sensing at least one operating characteristic of the selected corner includes measuring force between the sprung mass and the unsprung mass at each corner and wherein said desired operating characteristic is desired force.

21. The method of claim 20 wherein said step of sensing at least one operating characteristic further includes sensing at least one center of gravity sensor for sensing at least one of yaw, pitch, roll, heave, or warp of the vehicle.

22. The method of claim 19 further including the steps of providing a plurality of load sensors, each corner having an associated load sensor operatively connected between said sprung mass and its associated unsprung mass for providing a signal having a value indicative of the force on that corner and wherein said desired operating characteristic is force, determining the difference between the desired force and the sensed force, the difference providing an error signal, and wherein said step of multiplying includes multiplying the error signal times the variable gain factor.

23. The method of claim 22 further including the steps of providing a hub accelerometer, determining hub velocity from said hub accelerometer, summing the determined hub velocity with the amplified force error signal, said summation of the determined hub velocity with the amplified force error signal undamping the unsprung mass of said selected corner from the sprung mass.

24. The method of claim 23 further including the steps of providing a plurality of displacement sensors, each actuator having an associated displacement sensor for sensing the distance between the sprung mass and its associated unsprung mass for the selected corner, calculating the displacement of the actuator based upon the force error signal for the selected corner and providing a displacement error signal having a value equal to the difference between the calculated displacement and the measured displacement for the selected corner, and summing the displacement error signal with the actuator control signal.

25. The method of claim 24 further including the steps of sensing when an actuator is near its end of stroke position and decreasing the variable gain factor for a selected actuator when the selected actuator is within a predetermined distance of its end of stroke position.

26. The method of claim 22 further including the steps of providing a chassis accelerometer, determining chassis velocity from said chassis accelerometer, subtracting the determined chassis velocity with the amplified force error signal, said subtraction of the determined chassis velocity with the amplified force error signal damping the sprung mass.

* * * * *